United States Patent
Murakami

(10) Patent No.: US 7,667,774 B2
(45) Date of Patent: Feb. 23, 2010

(54) VIDEO SWITCHER AND VIDEO SWITCHING METHOD

(75) Inventor: Nobuyuki Murakami, Tokyo (JP)

(73) Assignee: Imagenics Co., Ltd., Tokyo (JP)

( * ) Notice: Subject to any disclaimer, the term of this patent is extended or adjusted under 35 U.S.C. 154(b) by 0 days.

(21) Appl. No.: 12/182,737

(22) Filed: Jul. 30, 2008

(65) Prior Publication Data
US 2009/0109334 A1 Apr. 30, 2009

(30) Foreign Application Priority Data
Oct. 29, 2007 (JP) .............................. 2007-279982

(51) Int. Cl.
*H04N 9/455* (2006.01)
(52) U.S. Cl. ....................... 348/500; 348/521; 348/525; 348/706
(58) Field of Classification Search ................. 348/500, 348/554, 722, 705, 706
See application file for complete search history.

(56) References Cited

U.S. PATENT DOCUMENTS

| | | | | | |
|---|---|---|---|---|---|
| 5,452,023 | A | * | 9/1995 | Kim | 348/731 |
| 5,786,845 | A | * | 7/1998 | Tsuria | 725/32 |
| 6,252,630 | B1 | * | 6/2001 | Kusumi et al. | 348/460 |
| 6,317,168 | B1 | * | 11/2001 | Seo | 348/725 |
| 6,384,868 | B1 | * | 5/2002 | Oguma | 348/564 |
| 6,515,707 | B1 | * | 2/2003 | Lee | 348/513 |
| 6,529,246 | B1 | * | 3/2003 | Maeda | 348/570 |
| 6,697,122 | B2 | * | 2/2004 | Kim | 348/554 |
| 6,791,602 | B1 | * | 9/2004 | Sasaki et al. | 348/159 |
| 6,836,297 | B2 | * | 12/2004 | Maeda | 348/569 |
| 7,319,493 | B2 | * | 1/2008 | Hata et al. | 348/584 |
| 2001/0015771 | A1 | * | 8/2001 | Kishimoto et al. | 348/705 |
| 2001/0022631 | A1 | * | 9/2001 | Scheffler et al. | 348/731 |
| 2002/0008780 | A1 | * | 1/2002 | Han | 348/554 |
| 2005/0018081 | A1 | * | 1/2005 | Tomikawa | 348/552 |
| 2007/0024746 | A1 | * | 2/2007 | Cole | 348/515 |
| 2007/0024760 | A1 | * | 2/2007 | Okanno | 348/706 |

FOREIGN PATENT DOCUMENTS

| | | |
|---|---|---|
| JP | 06-133234 | 5/1994 |
| JP | 06-149181 A | 5/1994 |
| JP | 07-134577 A | 5/1995 |
| JP | 2001-312263 A | 11/2001 |

* cited by examiner

*Primary Examiner*—Brian P Yenke
(74) *Attorney, Agent, or Firm*—Sughrue Mion, PLLC

(57) ABSTRACT

A video switcher includes: a video signal switching device for switching a video signal to be transmitted to a video display unit from a first video signal supplied from a first video input unit into a second video signal supplied from a second video input unit; and a synchronization signal switching device for switching a synchronization signal to be transmitted to the video display unit from a first synchronization signal supplied from the first video input unit into a second synchronization signal supplied from the second video input unit. The synchronization signal switching device starts transmission of the second synchronization signal to the video display unit after stops transmission of the first synchronization signal to the video display unit. The video signal switching device starts transmission of the second video signal to the video display unit, after stop of transmission of the first video signal to the video display unit and start of transmission of the second synchronization signal to the video display unit.

8 Claims, 4 Drawing Sheets

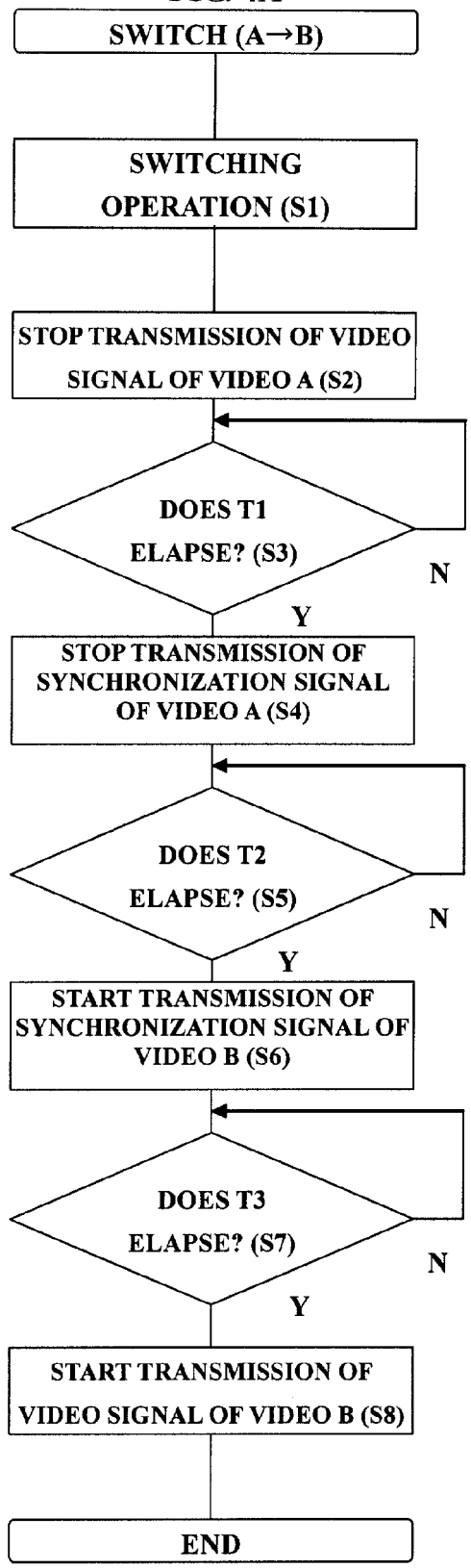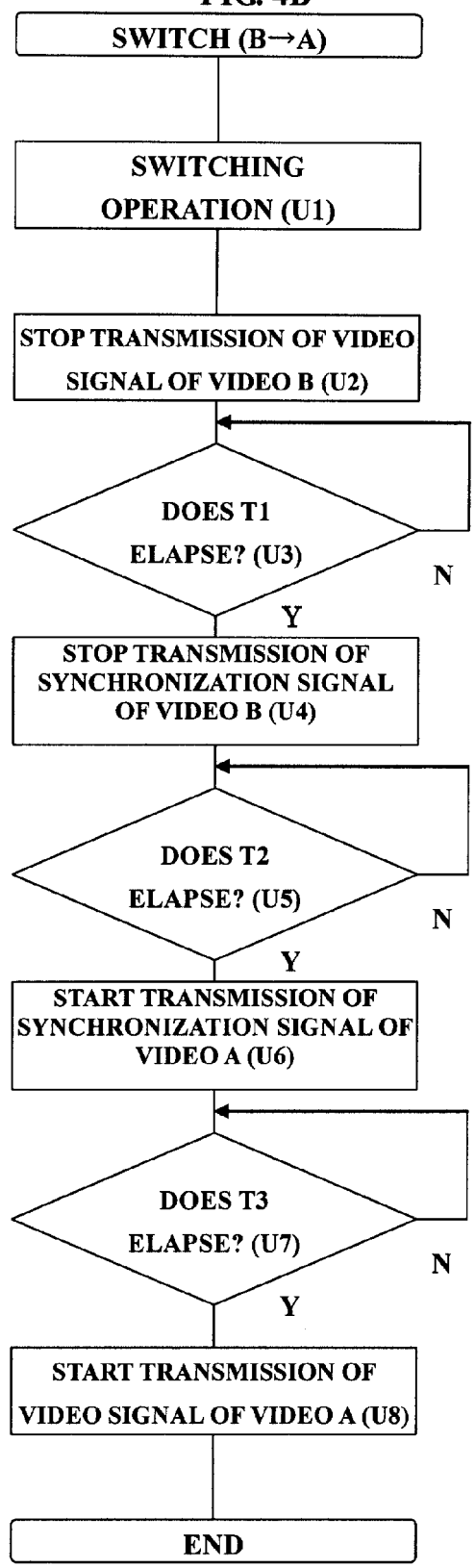

VIDEO SWITCHER AND VIDEO SWITCHING METHOD

BACKGROUND OF THE INVENTION

1. Field of the Invention

The present invention relates to a video switcher and a video switching method for selecting one video from a plurality of videos supplied from a plurality of video input units so as to output the selected video to a video display unit, and particularly reduce distortion of a displayed video at the time of switching videos.

2. Description of the Related Art

In video switchers which switch videos from a plurality of video input units (video sources) and simultaneously output the videos to video display units, displayed videos are distorted at the time of switching video sources. The distortion of the displayed videos is caused by discontinuity of synchronization signals from the video sources. The discontinuity of the synchronization signals occurs when the respective video sources operate independently and they are switched. A frame synchronizer is present as a device for dissolving the discontinuity of the synchronization signals, but since it is very expensive, the initial cost for the system rises drastically.

Many propositions regarding the reduction of the distortion of displayed videos at the time of switching video sources has been made. For example, there is proposed a method for setting video signals to be switched to a black level until the synchronization becomes stable and preventing distortion of the synchronization from being observed (for example, see Japanese Patent Application Laid-Open (JP-A) No. 6-149181). Also there is proposed a method for separating horizontal/vertical synchronization signals from video signals and outputting only synchronization signals for a constant time period of switching time so as to repress distortion of displayed videos at the time of switching (for example, see JP-A 6-133234).

According to the proposal of JP-A 6-149181, however, a unit for setting video signals to be switched to a black level is necessary, and thus the constitution of the switcher becomes complicated and thus the cost rises. The proposal of JP-A 6-133234, on the other hand, does not solve the discontinuity at the time of switching the synchronization signals separated from the video signals before and after switching.

BRIEF SUMMARY OF THE INVENTION

The present invention has been devised in order to solve the above problem of the conventional technique, and an object of the invention is to provide a video switcher and a video switching method which can solve discontinuity of synchronization signals at the time of switching video sources and reduce distortion of displayed videos in a simple constitution.

A video switcher according to an aspect of the present invention transmits a video signal supplied from one video input unit selected from a plurality of video input units by means of a switching operation and a synchronization signal corresponding to the video signal to a video display unit, and the video switcher includes: a video signal switching device for switching a video signal to be transmitted to the video display unit from a first video signal supplied from a first video input unit selected before the switching into a second video signal supplied from a second video input unit selected after the switching; and a synchronization signal switching device for switching a synchronization signal to be transmitted to the video display unit from a first synchronization signal supplied from the first video input unit into a second synchronization signal supplied from the second video input unit. The synchronization signal switching device starts to transmit the second synchronization signal to the video display unit after the transmission of the first synchronization signal to the video display unit is stopped. The video signal switching device transmits the second video signal to the video display unit after the transmission of the first video signal to the video display unit is stopped and after the second video signal is transmitted to the video display unit.

It is preferable that the video switcher includes a storage unit for storing a first time period between stop of transmission of the first synchronization signal to the video display unit and start of transmission of the second synchronization signal to the video display unit. The synchronization signal switching device starts to transmit the second synchronization signal to the video display unit based on the first time period stored in the storage unit.

It is more preferable that the video switcher includes a storage unit for storing a second time period between stop of transmission of the first video signal to the video display unit and start of transmission of the first synchronization signal to the video display unit. The synchronization signal switching device stops transmission of the first synchronization signal to the video display unit based on the second time period stored in the storage unit.

It is more preferable that the video switcher includes a storage unit for storing a third time period between start of transmission of the second synchronization signal to the video display unit and start of transmission of the second video signal to the video display unit. The video signal switching device starts to transmit the second video signal to the video display unit based on the third time period stored in the storage unit.

It is more preferable that the video switcher includes a time setting unit which sets the time periods stored in the storage unit.

According to the present invention, discontinuity of synchronization signals at the time of switching video sources is solved and distortion of displayed videos is reduced.

In addition, according to the present invention, switching timing of the video sources can be set in accordance with properties of the video display unit (performance characteristics) so that the distortion of displayed videos can be reduced.

BRIEF DESCRIPTION OF THE DRAWINGS

FIGS. 4A and 4B are flow charts illustrating a video switching method executed by the video switcher according to the embodiment of the invention.

DETAILED DESCRIPTION OF THE INVENTION

A video switcher and a video switching method according to an embodiment of the present invention will be described below with reference to the drawings.

Figure 1:
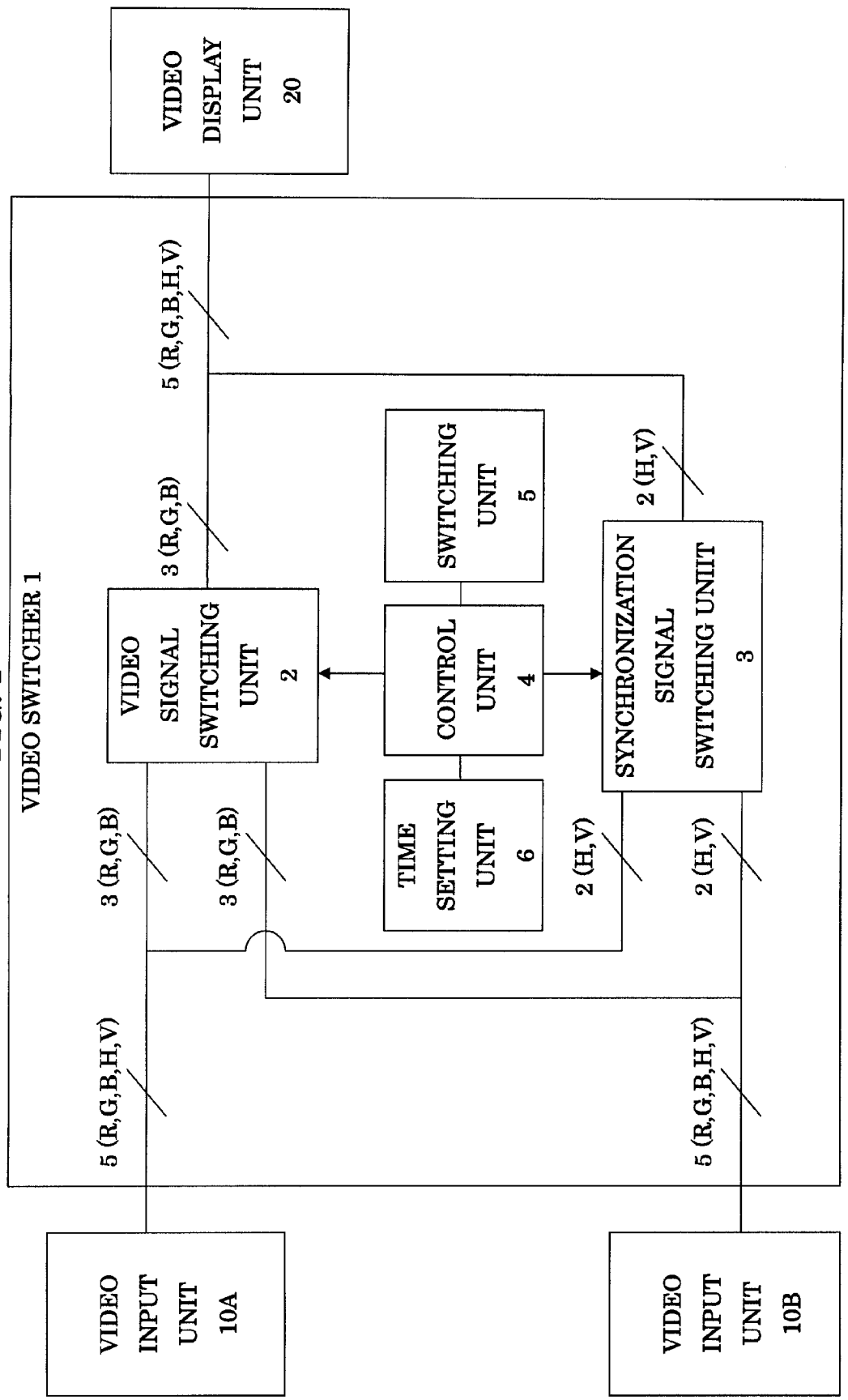
FIG. 1 is a block diagram illustrating a video switcher according to an embodiment of the present invention.

FIG. 1 is a block diagram illustrating the video switcher according to the embodiment of the invention. The video switcher 1 includes a video signal switching unit 2, a synchronization signal switching unit 3, a control unit 4, a switching unit 5, and a time setting unit 6.

A video input unit 10A and a video input unit 10B are connected to the video switcher 1. Video signals and synchronization signals corresponding to the video signals are supplied from the video input units to the video switcher 1. FIG. 1 illustrates an example where the video signals (R, G, B) and the synchronization signals (H, V) are supplied from the video input units to the video switcher 1.

Also, a video display unit 20 is connected to the video switcher 1. The video switcher 1 supplies the video signal and the synchronization signal from one of the video input units 10A and 10B to the video display unit 20.

Examples of the video input units 10A and 10B include DVD players and personal computers. Examples of the video display unit 20 include projectors and display devices.

Signals to be input from the video input units 10A and 10B to the video switcher 1 are analog signals or uncompressed digital signals whose video signals and synchronization signals are present independently. That is, the video switcher 1 itself does not separate the signal supplied from the video input unit into the video signal and the synchronization signal.

An example of the analog signal is RGB signal of a personal computer. Examples of the digital signal are DVI (Digital Visual Interface) signal and HDMI (High-Definition Multimedia Interface) signal.

The embodiment shown in FIG. 1 illustrates the example of the video switcher which is connected to two video input units and one video display unit. The numbers of video input units and video display units to be connectable (switchable) to the video switcher of the invention are, however, not limited to this. That is, for example, the number of the video input units may be 3 or more, or the number of the video display units may be two or more.

The switching unit 5 is a mechanical switch which can provide two states by means of an operator's manual operation of the video switcher 1. The switching unit 5 notifies the control unit 4 of any of the states. More specifically, when the switching unit 5 is in one state, an electric signal "1" is output to the control unit 4, and when the switching unit 5 is in the other state, an electric signal "0" is output.

The control unit 4 is a unit for making the video signal switching unit 2 and the synchronization signal switching unit 3 select the video signal and the synchronization signal from one of the two video input units 10A and 10B and transmit the selected signals to the video display unit 20, based on electric signal from the switching unit 5. More specifically, the control unit 4 controls the video signal switching unit 2 and the synchronization signal switching unit 3 so that when the electric signal from the switching unit 5 indicates "1", the video signal and the synchronization signal supplied from the video input unit 10A are supplied to the video display unit 20. On the other hand, the control unit 4 controls the video signal switching unit 2 and the synchronization signal switching unit 3 so that when the electric signal from the switching unit 5 indicates "0", the video signal and the synchronization signal supplied from the video input unit 10B are supplied to the video display unit 20.

That is, video displayed on the video display unit 20 is video supplied from the video input unit 10A when the electric signal from the switching unit 5 indicates "1", or video supplied from the video input unit 10B when the electric signal from the switching unit 5 indicates "0."

The video signal switching unit 2 selects any one of the video signals supplied from the video input units 10A and 10B based on a control signal from the control unit 4, and transmits the selected signal to the video display unit 20. A method for transmitting the video signal to the video display unit 20 by means of the video signal switching unit 2 will be described later.

The synchronization signal switching unit 3 selects any one of the synchronization signals supplied from the video input units 10A and 10B based on a control signal from the control unit 4, and transmits the selected signal to the video display unit 20. A method for transmitting the synchronization signal to the video display unit 20 by means of the synchronization signal switching unit 3 will be described later.

The time setting unit 6 sets and stores timing at the time of switching the video signals and the synchronization signals (time periods T1, T2 and T3, mentioned later).

Figure 2:
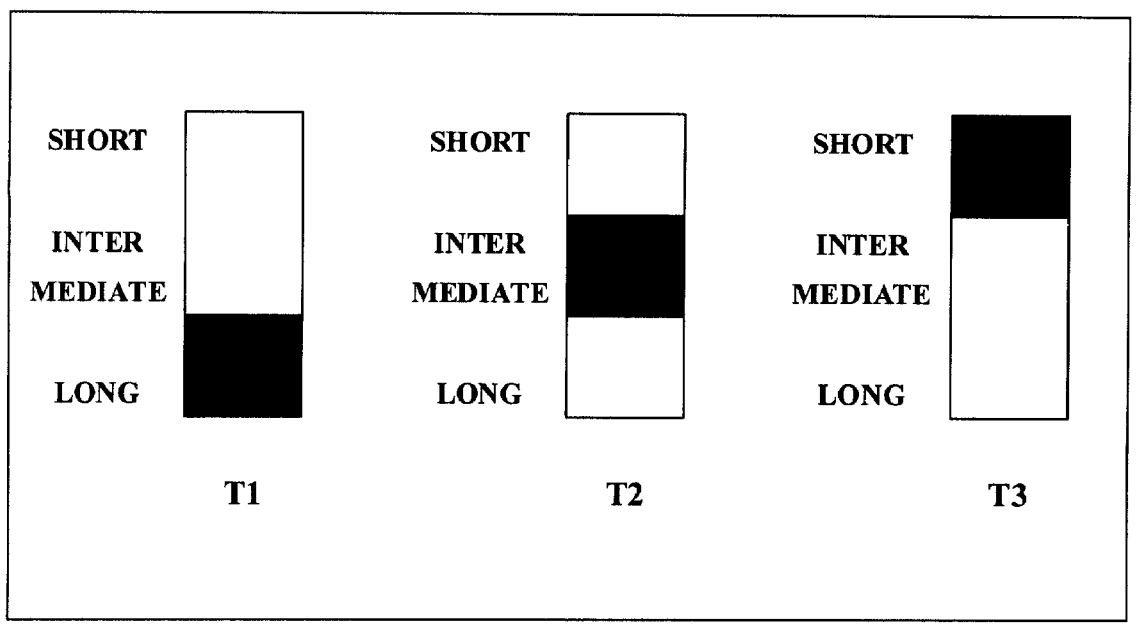
FIG. 2 is a pattern diagram illustrating an example of a time setting unit provided to the video switcher.

FIG. 2 is a pattern diagram illustrating an example of the time setting unit 6 composed of a DIP switch. FIG. 2 illustrates that one of "Short", "Intermediate" and "Long" is selectable (settable) for respective three kinds of time periods "T1", "T2" and "T3". In the drawing, the time period "T1" is set to "Long", "T2" is set to "Intermediate", and "T3" is set to "Short".

For example, "Short" is defined as 33.3 (ms), "Intermediate" is defined as 66.6 (ms), and "Long" is defined as 133.2 (ms).

Although details will be described later, the time periods set by the time setting unit 6 are used for determining stop and start timings of the video signals and the synchronization signals at the time of switching the video sources.

That is, prior to live presentation, for example, an operator of the video switcher 1 switches the video source connected to the video switcher 1 to thereby test whether or not a displayed video on the video display unit 20 is distorted at the time of the switching. When the displayed video is distorted as a result of the test, the time setting unit 6 is operated so as to change the setting of the three kinds of time periods, and retest is conducted to confirm whether or not the distortion of the displayed video is solved.

As mentioned above, the time setting unit 6 is an interface which allows an operator to set the time periods T1, T2 and T3 according to properties (performance or characteristics) of the video display unit.

The video signal switching unit 2, the control unit 4, the switching unit 5, and the time setting unit 6 configure a video signal switching device of the video switcher 1. Further, the synchronization signal switching unit 3, the control unit 4, the switching unit 5, and the time setting unit 6 configure a synchronization signal switching device of the video switcher 1.

Now, description will be given of the video switching method according to an embodiment of the present invention to be executed by the video switcher 1.

Figure 3:
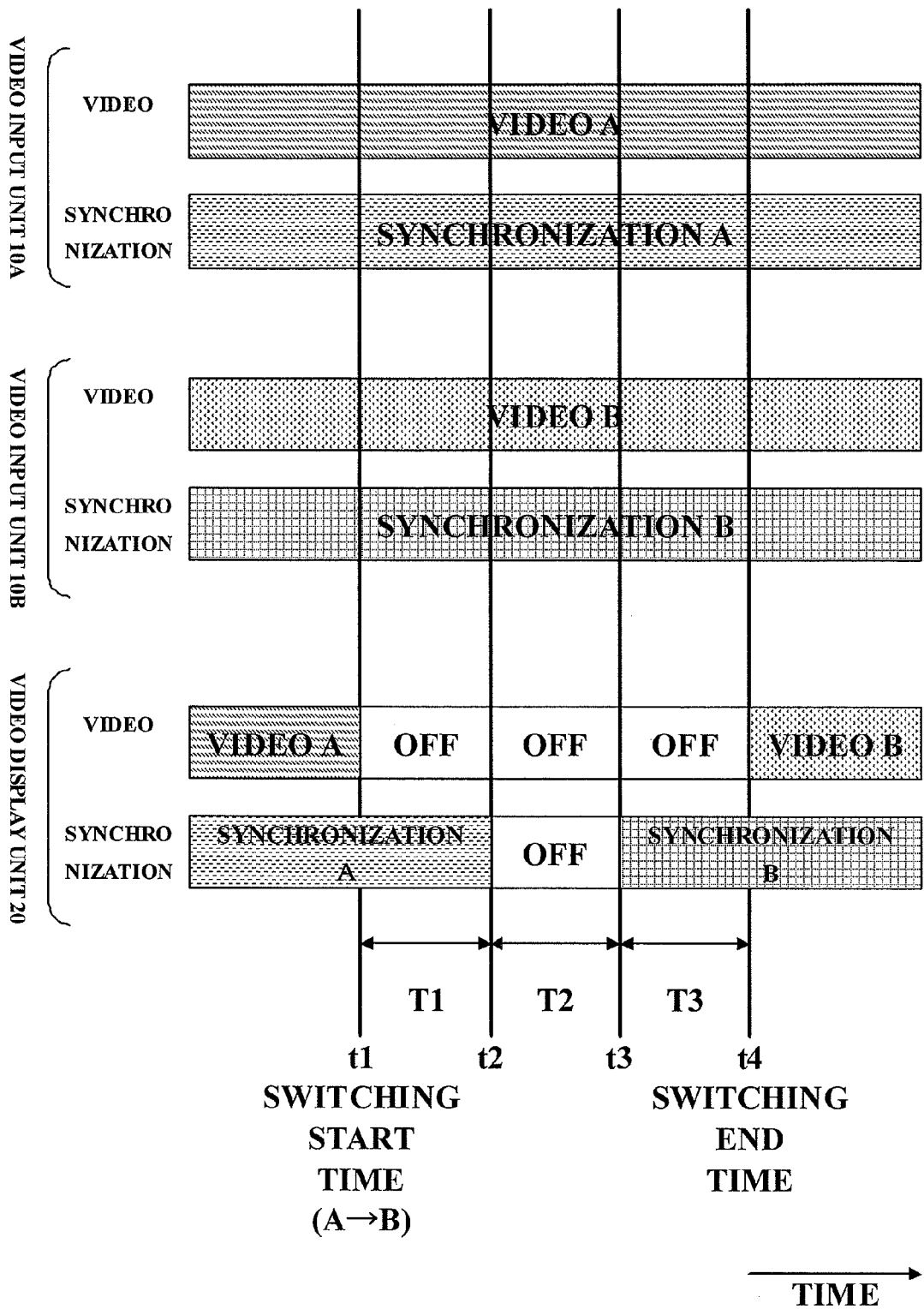
FIG. 3 is a time chart illustrating a relationship between a video signal and a synchronization signal supplied from a video input unit to the video switcher, and a relationship between a video signal and a synchronization signal supplied from the video switcher to a video display unit.

FIG. 3 is a timing chart illustrating a relationship between video signals and synchronization signals supplied from the video input units 10A and 10B to the video switcher 1, and the video signals and the synchronization signals supplied (transmitted) from the video switcher 1 to the video display unit 20, before and after the video source is switched from the video input unit 10A into 10B.

In FIG. 3, at time "t1", the switching operation is performed, namely, an operator of the video switcher 1 operates the switching unit 5 so as to switch the video source from the video input unit 10A into 10B. At time "t4", the switching is completed. In other words, a video displayed on the video display unit 20 is a video A before time "t1", and is a video B after time "t4".

For convenience of the description, in the following description, video from the video input unit 10A is described as "video A" and video from the video input unit 10B is described as "video B". A video signal of the video A is described as "video signal A", and its synchronization signal is described as "synchronization signal A". Similarly, a video signal of the video B is described as "video signal B", and its synchronization signal is described as "synchronization signal B".

FIG. 3 illustrates that the video signal A and the synchronization signal A are supplied from the video input unit 10A, and the video signal B and the synchronization signal B are supplied from the video input unit 10B, to the video switcher 1 before and after the switching.

FIG. 3 also illustrates that the video switcher 1 transmits the video signal A and the synchronization signal A to the video display unit 20 until the time "t1" at which the switching operation is performed, and stops the transmission of the video signal A at the time "t1".

At time "t2" after a lapse of the time period "T1" from time "t1", the video switcher 1 also stops the transmission of the synchronization signal A.

Further, the video switcher 1 transmits neither the video signal nor the synchronization signal to the video display unit 20 until time "t3" after lapse of the time period "T2" from time "t2".

At time "t3", the video switcher 1 starts to transmit the synchronization signal B to the video display unit 20, and starts to transmit the video signal B at time "t4" after lapse of the time period "T3" from time "t3".

A method for operating the video switcher 1 for switching the video signals and the synchronization signals according to the timing chart shown in FIG. 3 will be described below with reference to flow charts shown in FIGS. 4A and 4B.

FIG. 4A is a flow chart illustrating the operation of the video switcher 1 when the video source is switched from the video input unit 10A into the video input unit 10B, similarly to the timing chart shown in FIG. 3. More specifically, a video supplied from the video input unit 10A is displayed on the video display unit 20 before switching, and a video supplied from the video input unit 10B is displayed on the video display unit 20 after the switching is completed.

An operator of the video switcher 1 operates the switching unit 5 so as to switch the video source from the video input unit 10A into 10B (S1). The switching unit 5 notifies the control unit 4 of the electric signal "0" in response to this switching.

Upon receiving the notification of the electric signal "0" from the switching unit 5, the control unit 4 makes the video signal switching unit 2 stop the transmission of the video signal A (S2). When the transmission of the video signal is stopped, a video to be displayed on the video display unit 20 becomes a black video, but the synchronization signal A is continuously supplied and thus the displayed video is not distorted. Thereafter, the control unit 4 monitors the lapse of the time period T1 set by the time setting unit 6 (S3).

After the lapse of the time period T1, the control unit 4 makes the synchronization signal switching unit 3 stop the transmission of the synchronous signal A (S4). After the transmission of the synchronization signal is stopped, the video display unit 20 operates under the presence of no signals, but a displayed video is not distorted since neither video signals nor synchronization signals are supplied. Thereafter, the control unit 4 monitors a lapse of the time period T2 set by the time setting unit 6 (S5).

After the lapse of the time period T2, the control unit 4 controls the synchronization signal switching unit 3 to start to transmit the synchronization signal B (S6). The video display unit 20 starts the operation under the presence of signals, but a video signal is not supplied thereto, and thus a displayed video is not distorted. Thereafter, the control unit 4 monitors a lapse of the time period T3 set by the time setting unit 6 (S7).

After the lapse of the time period T3, the control unit 4 makes the video signal switching unit 2 start the transmission of a video signal B (S8). On the video display unit 20, the displayed black video is switched into the video B. At the time of switching from the black video into the video B, the synchronization signal B is supplied to the video display unit 20 prior to the supply of the video signal B. For this reason, discontinuity of the synchronization signals does not occur. At the time of switching from the black video into the video B, therefore, the displayed video on the video display unit 20 is not distorted.

Also at the time of switching from the video B into the video A, as shown in FIG. 4B, the transmission of the video signal B is stopped (U2), followed by stopping the transmission of the synchronization signal B (U4). Thereafter, the transmission of the synchronization signal A is started (U6), and the transmission of the video signal A is started (U8).

According to the above embodiment, at the time of switching the video source, a time lag (T2) is provided between stop of transmission of synchronization signal A and start of transmission of synchronization signal B. The discontinuity of the synchronization signals to be transmitted to the video display unit 20 is not present at the time of switching the video source due to the time lag. This enables to reduce the distortion of the displayed video on the video display unit 20.

The video signal B may be transmitted to the video display unit 20 after the transmission of the video signal A to the video display unit 20 is stopped and after the transmission of the synchronization signal B to the video display unit 20 is started. That is, depending on the properties of the video display unit 20, it is possible that the time T3 is set as T3=0, and the video signal B is transmitted simultaneously with the synchronization signal B to the video display unit 20.

In the above embodiment, the time setting unit which stores three kinds of times T1, T2 and T3 is composed of a DIP switch but may be composed of a jumper switch.

In addition to the unit such as the DIP switch which physically stores times, a unit such as EEPROM (nonvolatile memory) which electrically stores times may be used. When EEPROM is used, three kinds of times stored in EEPROM are written into EEPROM as a storage unit from a setting unit such as a personal computer connected to the video switcher.

What is claimed is:

1. A video switcher which transmits a video signal and a synchronization signal corresponding to the video signal to a video display unit, the transmitted video signal and synchronization signal are supplied from one video input unit selected from a plurality of video input units by a switching operation, the video switcher comprising:

a video signal switching device which switches a video signal to be transmitted to the video display unit from a first video signal supplied from a first video input unit before a completion of the switching operation to a second video signal supplied from a second video input unit after the completion of the switching operation;

a synchronization signal switching device which switches the synchronization signal to be transmitted to the video display unit from a first synchronization signal supplied from the first video input unit to a second synchronization signal supplied from the second video input unit; and a storage unit for storing a time period between a stop of transmission of the first synchronization signal to the video display unit and a start of transmission of the second synchronization signal to the video display unit, wherein the synchronization signal switching device stops transmitting the first synchronization signal after a first time period after a stop of transmission of the first video signal lapses and starts to transmit the second synchronization signal to the video display unit after a lapse of a constant time period T (T>0) from the stop of transmission of the first synchronization signal based on the time period stored in the storage unit, and the video signal switching device starts transmitting the second video signal to the video display unit after the stop of transmission of the first video signal to the video display unit, leading to no signal sent to the video display unit, and after a second time period after the start of transmission of the second synchronization signal to the video display unit lapses, to display a black video on the video display unit between the stop of transmission of the first video signal and the start of transmission of the second video signal to the video display unit.

2. The video switcher according to 1, wherein the storage unit stores the first time period between the stop of transmission of the first video signal to the video display unit and the stop of transmission of the first synchronization signal to the video display unit, wherein the synchronization signal switching device stops the transmission of the first synchronization signal to the video display unit based on the first time period stored in the storage unit.

3. The video switcher according to elaim 1, wherein the storage unit stores the second time period between the start of transmission of the second synchronization signal to the video display unit and the start of transmission of the second video signal to the video display unit, wherein the video signal switching device starts the transmission of the second video signal to the video display unit based on the second time period stored in the storage unit.

4. The video switcher according to claim 1, further comprising:

a time setting unit which sets the time period stored in the storage unit,

5. A video switching method for transmitting a video signal and a synchronization signal corresponding to the video signal to a video display unit, the transmitted video signal and synchronization signal are supplied from one video input unit selected from among a plurality of video input units by a switching operation of a video switcher, the video switcher contains:

a video signal switching device for switching a video signal to be transmitted to the video display unit from a first video signal supplied from a first video input unit to a second video signal supplied from a second video input unit;

a synchronization signal switching device for switching a synchronization signal to be transmitted to the video display unit from a first synchronization signal supplied from the first video input unit to a second synchronization signal supplied from the second video input unit; and a storage unit which stores a time period between a stop of transmission of the first synchronization signal to the video display unit and a start of transmission of the second synchronization signal to the video display unit, the method comprising:

stopping transmitting the first synchronization signal after a first time period after a stop of transmission of the first video signal lapses;

starting to transmit the second synchronization signal to the video display unit after a lapse of a constant time period T (T>0) from the stop of the transmission of the first synchronization signal to the video display unit, based on the time period stored in the storage unit; and starting to transmit the second video signal to the video display unit after the stop of transmission of the first video signal to the video display unit, leading to no signal sent to the video display unit, and after a second time period after the start of transmission of the second synchronization signal to the video display unit lapses, to display a black video on the video display unit between the stop of transmission of the first video signal to the video display unit and the start of transmission of the second video signal to the video display unit.

6. The method according to claim 5, further comprising:

storing the first time period between the stop of transmission of the first video signal and the stop of transmission of the first synchronization signal to the video display unit in the storage unit; and stopping transmitting the first synchronization signal to the video display unit based on the first time period stored in the storage unit.

7. The method according to claim 5, further comprising:

storing the second time period between the start of transmission of the second synchronization signal and the start of transmission of the second video signal to the video display unit in the storage unit; and starting transmitting the second video signal to the video display unit based on the second time period stored in the storage unit.

8. The method according to claim 5, further comprising:

setting the time period stored in the storage unit with a time setting unit.

* * * * *